United States Patent [19]
Barrett

[11] 3,867,815
[45] Feb. 25, 1975

[54] HEAT ENGINE
[76] Inventor: George M. Barrett, R.R. No. 5, Galt, Ontario, Canada
[22] Filed: June 9, 1972
[21] Appl. No.: 261,232

Related U.S. Application Data
[63] Continuation-in-part of Ser. No. 86,738, Nov. 4, 1970, Pat. No. 3,698,184.

[52] U.S. Cl. .................. 60/682, 62/467, 60/690
[51] Int. Cl. .................. F01k 25/00, F25b 27/00
[58] Field of Search ............ 418/8; 62/467; 60/682, 60/690, 36, 1, 57 R, 57 T, 62, 95

[56] References Cited
UNITED STATES PATENTS

| | | | |
|---|---|---|---|
| 3,194,026 | 7/1965 | La Fleur | 62/467 |
| 3,259,176 | 7/1966 | Rice et al. | 62/467 |
| 3,321,930 | 5/1967 | La Fleur | 62/467 |
| 3,355,903 | 12/1967 | La Fleur | 62/467 |
| 3,479,817 | 11/1969 | Minto | 60/36 |
| 3,589,436 | 6/1971 | Anderson | 62/467 |
| 3,675,416 | 7/1972 | Maeda | 60/36 |
| 3,698,184 | 10/1972 | Barrett | 60/36 |

OTHER PUBLICATIONS
Power Engineering, January 1958; pp. 72–74, Volume 1, No. 6.
Physics, by E. Hausmann & E. Slack, D. Van Nostrand Co., New York, 3rd ed., 1948, pgs. 309–11.

Primary Examiner—Martin P. Schwadron
Assistant Examiner—Allen M. Ostrager
Attorney, Agent, or Firm—Diller, Brown, Ramik & Wight

[57] ABSTRACT

This disclosure relates to a heat engine which operates generally on the basis of the Carnot cycle and includes a rotor mounted within a chamber and sealed relative to the chamber by means of a plurality of radiating vanes. The engine is provided with a plurality of inlet ports and a throttle valve for selectively communicating the inlet ports with a supply of heated compressed gases to vary the output characteristics of the engine. Also, a portion of the gas compressed in the mechanical compression cycle of the engine is by-passed through a condensor and evaporator and returned to the engine in the isothermal cycle thereof with the condensor functioning as a heater and the evaporator functioning as an air conditioning element to be used in conjunction with an installation of which the engine may be a part.

10 Claims, 2 Drawing Figures

HEAT ENGINE

This application is a continuation-in-part of my copending application Ser. No. 86,738, filed Nov. 4, 1970, entitled LOW POLLUTION HEAT ENGINE, now U.S. Pat. No. 3,698,184, granted October 17, 1972.

This invention relates to a novel heat engine which operates generally in accordance with the Carnot cycle, and more particularly to an improved throttle valve arrangement for such engine and heat exchange means utilizing a portion of the gas compressed in the mechanical compression cycle of the engine to selectively function as a heater or air conditioner for a system in which the engine may be mounted.

BACKGROUND OF THE INVENTION

In my aforementioned copending application Ser. No. 86,738, there has been disclosed a heat engine which operates generally in accordance with the Carnot cycle. This engine has proved to be operable as disclosed, but since the original development of the engine, it has been found that the performance of the invention may be improved by an improved throttle valve arrangement, and the gases compressed in the mechanical compression cycle of the invention can be advantageously utilized for the purpose of heating or cooling the components of an installation of which the engine may be a part.

SUMMARY OF THE INVENTION

In accordance with this invention, it is proposed to improve the rotary engine disclosed in my copending application Ser. No. 86,738 by modifying the throttle valve thereof so that the engine will function at optimum efficiency in operations where a variation in power of the motor is required, such as in a motor vehicle, by providing an improved throttle valve arrangement. It is proposed to provide the housing or casing of the engine with a plurality of inlet ports circumferentially spaced along the area wherein isothermal expansion occurs with the throttle valve selectively controlling the inlet port through which compressed and heated gases are admitted into the casing to react against vanes of an associated rotor. By providing the multiple inlet ports and controlling the admission of gas to the engine therethrough, the engine is capable of producing a high torque at low speed and then having its work characteristics thereof modified so as to permit increased speeds as is required by the associated mechanism, such as a motor vehicle.

In today's modern automobile, there is a necessity for a heater and a great demand for air conditioning. A heat engine as disclosed in my copending application Ser. No. 86,738 recycles mechanically compressed gases through a heater to the inlet port thereof. It has been found that a portion of these recycled compressed gases may be bypassed through heat exchange means and returned at a lower pressure to the engine during the isothermal compression cycle thereof without materially changing the work characteristics of the engine. By forming the heat exchange means to include a condenser and an evaporator and installing the same independently of one another, the condenser may be utilized as a heat source and the evaporator may be utilized to withdraw heat or as a coolant source.

With the above and other objects in view that will hereinafter appear, the nature of the invention will be more clearly understood by reference to the following detailed description, the appended claims and the several views illustrated in the accompanying drawings:

Figure 2:
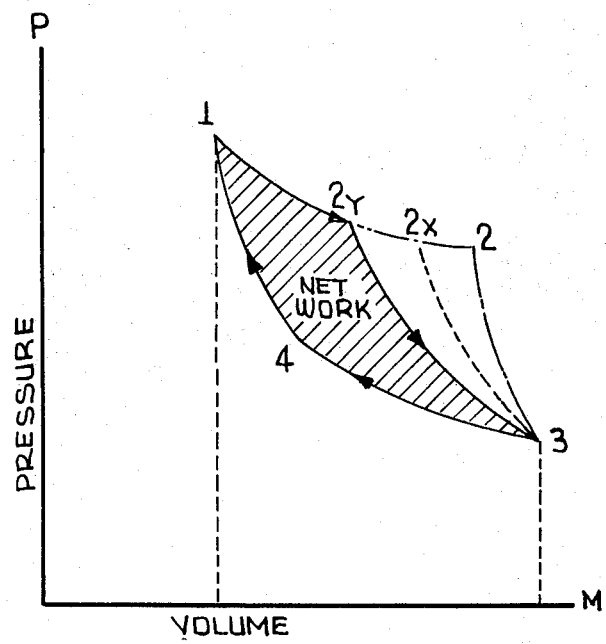
FIG. 2 is a pressure-volume diagram showing the Carnot cycle of a heat engine using a perfect gas and illustrating the net work conditions with the several positions of gas inlet.

Reference is first made to FIG. 2 wherein there is illustrated a pressure-volume diagram showing the network available from a heat engine using a perfect gas operating in accordance with the well-known Carnot cycle. Starting at point 1 on the diagram, normally there is an isothermal or constant temperature expansion process between points 1 and 2. This is considered as phase A. In accordance with the Carnot principle, at this time, heat is supplied to the engine from a high temperature reservoir and work is produced.

Next, there is a reversible adiabatic expansion process between points 2 and 3, during which the gas continues to expand against a decrease in pressure and does further work, while the temperature of the gas simultaneously drops. This is considered as phase B of the cycle and during this time no heat transfer occurs.

In the third phase of the Carnot cycle (phase C) there is an isothermal compression between 3 and 4 during which some compression work is put back into the gaseous system while the low temperature heat of the gas is transferred to a low temperature heat reservoir.

Finally, in the fourth phase in the Carnot process between points 4 and 1 (phase D) there must be a reversible adiabatic compression in which compression work is required to return the system to its exact starting point, point 1. In accordance with this invention, a rotary engine, generally identified by the numeral 10 is provided. This rotary engine basically operates on the Carnot cycle principle, but has certain improvements incorporated therein which permit the same to produce an acceptable amount of work so as to be economically feasible.

The engine 10 basically includes a housing or casing 11 defining a generally cylindrical chamber 12. A rotor 13 is mounted within the housing 11 for rotation about an axis offset from the axis of the cylinder 12 whereby the rotor closely approaches the housing 11 at one point in the chamber and is disposed remote from the housing at an opposite point in the chamber, the point where the rotor 13 becomes closest to the housing 11 being a point of maximum gas compression and corresponding to point 1 of the pressure-volume diagram of FIG. 2.

It is to be noted that the rotor 13 is provided with a plurality of circumferentially spaced vanes 14. The specific constructional details of the vanes 14 and the mounting thereof relative to the rotor 13 have not been illustrated herein inasmuch as these features do not constitute a part of the invention. It is to be understood, however, that the vanes 14 are mounted for radial sliding movement in the rotor 13 and are constantly urged radially outwardly from the rotor 13 so that they are in constant sealing contact with the wall of the chamber 12.

In the illustrated embodiment of the invention, the rotor 13 is intended to rotate in a clockwise direction. Shortly in advance of point 1, the housing 11 is provided with an exit port 15 for compressed gases, the exit port 15 opening into an exhaust line 16 which is coupled by means of a generally T-fitting 17 to a by-pass line 18. The by-pass line 18 is coupled to a heater 20 wherein the compressed gases are heated prior to being returned to the chamber defined by the housing or casing 11.

A supply line 21 receives the heated and compressed gases from the heater 20 and delivers the gases to a throttle assembly generally identified by the numeral 22. The throttle assembly 22 includes a plurality of separate supply lines 23, 24 and 25 which open, respectively, into the chamber defined by the housing 11 through inlet ports 26, 27 and 28. The inlet ports 26, 27 and 28 are disposed at circumferentially spaced points along the housing or casing 11 between the previously mentioned point 1 and the circumferentially spaced point 2 which corresponds to point 2 of the pressure-volumne diagram of FIG. 2. At this time, it is pointed out that in FIG. 2 there is illustrated three superimposed pressure-volume diagrams with points 2X, 2Y and 2 corresponding to the supplying of heated and compressed gases through inlet ports 26, 27 and 28, respectively.

At this time, it is to be noted that flow of heated and compressed gases from the heater 20 through the supply line 21 into the supply lines 23, 24 and 25 are controlled by a rotary throttle valve 30. It is to be understood that the throttle valve 30 may be of any conventional type and is preferably one which will operate in sequence, that is one which will sequentially supply a fluid into the chamber defined by the housing 11 through the inlet port 26, the inlet port 27 and the inlet port 28. A further discussion of the throttle arrangement 22 will be found hereinafter.

At this time it is desired to more particularly correlate the heat engine 10 with the pressure-volume diagram of FIG. 2. It is to be noted that in addition to the points 1 and 2 previously mentioned, the diagrammatic showing of the engine 10 also includes points 3 and 4 which correspond to points 3 and 4 on the pressure-volume diagram of FIG. 2.

In addition, the gaseous condition phase between points 1 and 2 is designated as phase A. In a like manner, the gaseous condition phase between points 2 and 3 is designated as phase B. The gaseous condition phase between points 3 and 4 is identified as phase C while the gaseous condition phase between points 4 and 1 is identified as phase D. All of these phases correspond to the four phases A, B, C and D on the pressure-volume diagram of FIG. 2.

In the area of gaseous condition phase C, it is highly desirable that a maximum amount of retained heat be removed from the gas within the chamber 12. Accordingly, the housing 11 is provided with external flow passages 31 of which only three have been illustrated. These external flow passages are preferably in the form of small housings which have external fins so as to facilitate heat transfer. The passages 31 open into the chamber 12 through ports 32. It will be readily apparent that as the rotor 13 rotates, the gas within the chamber 12 will be progressively compressed and the gas will be free to flow into the passages 31. As the vanes 14 pass the respective passages 31, compressed gas within the passages will flow thereout of partially due to the cooling action by the fins surrounding the housing defining the passages and partially due to the fact that immediately behind each vane as it passes the respective port 32, the pressure is lower than the time when the next succeeding vane substantially reaches the same port 32.

It is also to be noted that in the illustrated form of the invention, the passages 31 have been connected together by circumferential flow passages 33. These may or may not be utilized. When they are utilized, there will also be flow in a generally counterclockwise direction of gases through the passages 31 and 33 due to the fact that the pressure within the chamber 12 adjacent the point 4 will be greater than that adjacent the point 3.

It will be readily apparent that by reducing the heat load of the gases in the chamber 12 between the points 3 and 4, the gases will be substantially compressed, making it easier to further compress the gases as they pass between points 4 and 1 wherein a maximum compression of the gases occurs.

Figure 1:
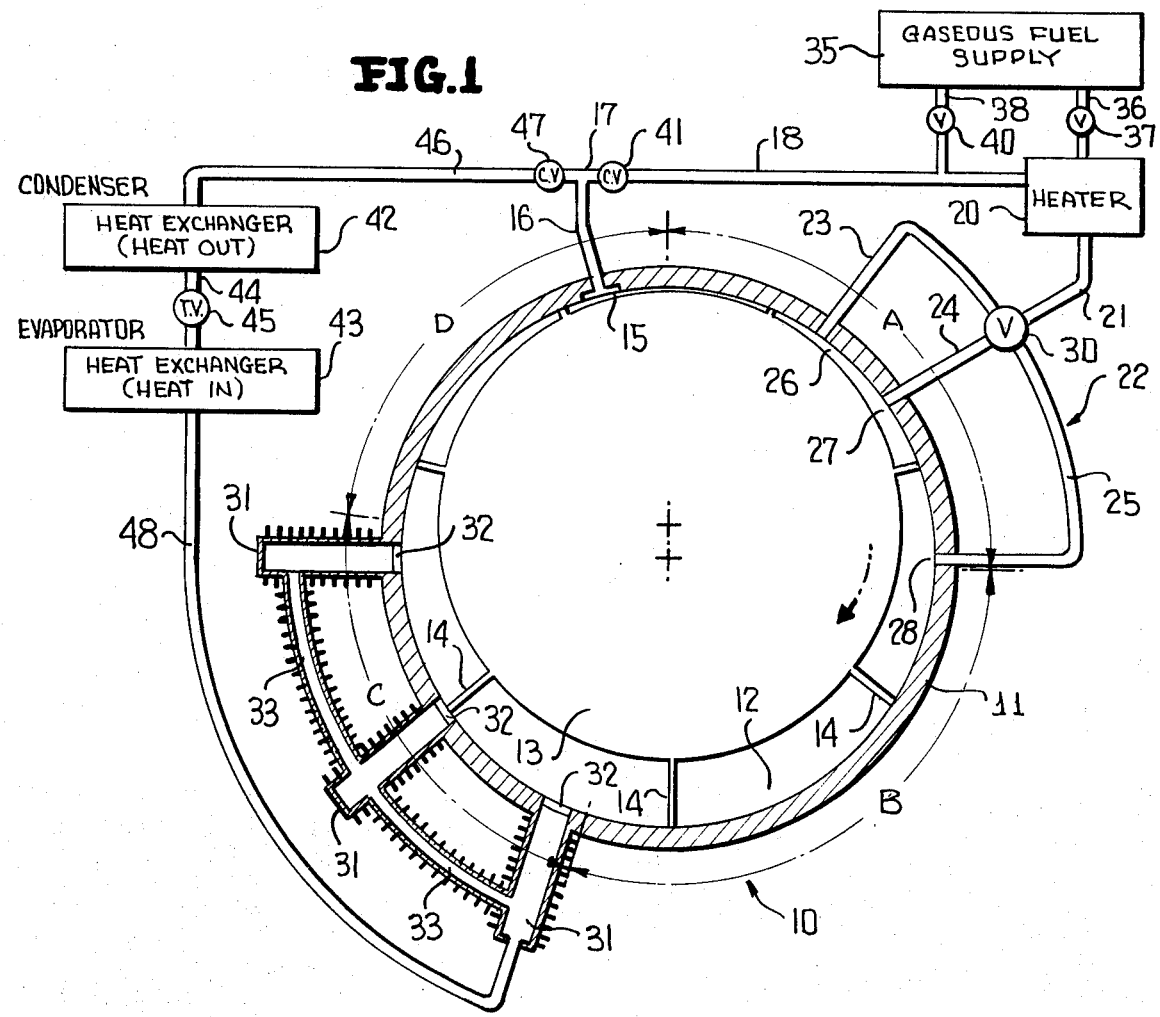
FIG. 1 is a schematic view of a heat engine constructed in accordance with this invention utilizing the improved throttle valve and the associated heat exchange device.

It is to be understood that with the specific construction of the heat engine 10, the slope of the pressure-volume line between points 1 and 2 be maintained more nearly flat notwithstanding the natural increase in volume of the gases due to the increase in spacing between the rotor and the housing between points 1 and 2. In a like manner, the slope of the line C between points 3 and 4 can be made more flatter by more effectively compressing the gases, thereby holding the pressure of the gases between points 3 and 4 to a minimum. Thus, the efficiency of the heat engine 10 can be much improved and an efficient engine operation is possible with sufficient power being available to run desired equipment. It is believed to be feasible utilizing heat engines of the type illustrated in FIG. 1 in the operation of vehicles and other equipment.

While the heater 20 may be of any construction, it is proposed to form the heater 20 of the combustion type utilizing a gaseous fuel. It has been found that certain hydrocarbon gases, including propane and butane, for example, may be effectively utilized as fuels. These hydrocarbon gases, when burned, have a relatively pollution-free exhaust as compared to the exhaust of internal combustion engines.

In accordance with this invention, a fuel tank 35 is provided wherein the hydrocarbon gas fuel is maintained in a liquid form under pressure. The fuel will be supplied to the heater 20 through a pipe 36 in which a control valve 37 is positioned.

At this time it is pointed out that the construction of the heater 20 may vary greatly depending upon the particular use of the heat engine 10. In accordance with the specific disclosure of this application, the heat engine is to be utilized in conjunction with equipment, such as a motor vehicle, with the power demand varying greatly. Thus, the heater 20 may be provided with a burner of a multiple stage construction including a pilot type burner which will provide sufficient power for the heat engine 10 to operate at what may be considered to be "idle" speeds.

It is also proposed here to utilize the same gas as that supplied as fuel to the heater 20 as the gas within the chamber 12. It has been found that certain hydrocarbon gases, including propane and butane, would serve amply well as the gas within the heat engine 10. Propane in particular has been found to be an excellent lubricant for the vanes 14 which are in sliding contact with the walls of the housing or casing 11 defining the chamber 12.

It is fully recognized that there is always a minor leakage of gas under pressure from the rotary engine. Therefore, it is proposed to provide for the constant replacement of gas which may be lost from the chamber 12. To this end, a further line 38 extends from the fuel supply tank 35 to the by-pass passage 18. A valve 40 controls the flow of gas through the line 38. If desired, the valves 37 and 40 may be interconnected so that gas will be delivered from the gaseous fuel supply 35 to the heat engine 10 only when the heater 20 is functioning and the engine is running. It is to be understood that inasmuch as the pressure of the gas within the gaseous fuel supply 35 will be greater than that passing into the by-pass line 18 from the engine 10, a check valve 41 should be incorporated in the by-pass line 18 upstream of the connection of the line 38 thereto.

It is also proposed to salvage any gas which may escape out of the housing 11 by mounting the housing 11 within a simple casing (not shown) and exhausting air and other gases surrounding the housing 11 into the heater 20 for the purpose of burning escaped gases so that there will be no wasted fuel due to the leakage.

While it is proposed to utilize the same hydrocarbon gas as a fuel for the heater 20 and as the gas within the chamber 12, it is to be understood that a different gas could be supplied to the chamber 12. However, such different gas would still be connected to the chamber 12 through the by-pass passage 18 in a manner illustrated except that it would be still in a separate tank from the fuel supply.

Returning now to the throttle assembly 22, it will be seen that the throttle assembly is one that could be beneficially utilized in conjunction with a motor vehicle wherein different power requirements will be required at different speeds. As is clearly shown in the pressure-volume diagram of FIG. 2 which defines network available with the engine 10, the available net work will vary with the particular setting of the throttle valve 30. However, the arrangement is one which would provide for an efficient engine operation for use in conjunction with a motor vehicle.

It is also well known that the usual motor vehicle is provided with a heater for conditioning the air therein. Further, many motor vehicles are now provided with air conditioning units so as to cool the vehicle air. The heating and cooling of such a vehicle can be obtained in conjunction with the engine 10 with a minimum loss of power. This is accomplished by providing a condenser 42 and an evaporator 43 connected by a flow line 44 having a throttle valve 45 incorporated therein. The condenser receives compressed gases from the engine 10 through the T-fitting 17 and a line 46, the line 46 having incorporated therein a check valve 47 to prevent backflow of gases. A return line 48 extends from the evaporator back into the chamber, preferably at the start of the phase C through the first of the passages 31 in the direction of rotor rotation.

It is to be understood that in the condenser 42, which functions as a heater for an associated motor vehicle, the compressed gases are rapidly cooled and thus become even more compressed. As the compressed gases from the condenser pass through the throttle valve 45, which may be in the form of an expansion valve, and flow into the evaporator, the compressed gases expand and absorb heat, thus functioning to cool air passing therethrough so as to function as an air conditioning unit for an associated vehicle.

It is to be understood that the necessary air ducts to effect the heating and cooling of air within a motor vehicle may be readily associated with the condenser 42 and the evaporator 43 in any conventional manner. Accordingly, no attempt has been made to illustrate the same here.

It is also feasible to utilize the engine and the heat exchanger thereof as components of a total energy system. Such system may utilize the engine to drive a power supply unit, such as an electrical power producting unit, for an installation and at the same time utilizing the heat exchanger to selectively provide for necessary heating and cooling required by the installation.

Although only a preferred embodiment of the invention has been specifically illustrated and described herein, it is to be understood that minor variations may be made in the heat engine and the components thereof without departing from the spirit and scope of the invention, as defined by the appended claims.

I claim:

1. A heat engine of the type including a housing defining a generally cylindrical chamber, a rotor mounted within said chamber in eccentric relation, and vanes carried by said rotor in sliding sealing contact with said housing, said rotor being closest to said housing at one point in said chamber and most remote from said housing at a second point in said chamber, a working gas in said chamber, and in accordance with the Carnot cycle of operation said engine and said working gas having four gaseous conditions in sequence during rotation of said rotor as follows: A-isothermal expansion, B-reversible adiabatic expansion, C-isothermal compression and D-reversible adiabatic compression; the improvement residing in a by-pass passage coupled to said chamber on opposite sides of said one point and in the areas of gaseous conditions D and A, respectively, heater means for heating gases flowing through said by-pass passage to provide said isothermal expansion, sealed external counterflow passage means connected to said chamber for receiving gases from said chamber compressed by the action of said rotor and returning such gases to said chamber in the area of lower pressure gaseous condition C, and cooling means coupled to said external flow passage means for providing said isothermal compression, and variable throttle means for varying said A-isothermal expansion to vary the output of said engine, said variable throttle means including means for varying the point in the area of gaseous condition A wherein the heated working gas is returned to said chamber.

2. A heat engine of the type including a housing defining a generally cylindrical chamber, a rotor mounted within said chamber in eccentric relation, and vanes carried by said rotor in sliding sealing contact with said housing, said rotor being closest to said housing at one point in said chamber and most remote from said housing at a second point in said chamber, a working gas in said chamber, and in accordance with the Carnot cycle of operation said engine and said working gas having four gaseous conditions in sequence during rotation of said rotor as follows: A-isothermal expansion, B- reversible adiabatic expansion, C-isothermal compression and D-reversible adiabatic compression; the improvement residing in a by-pass passage coupled to said chamber on opposite sides of said one point and in the areas of gaseous conditions D and A, respectively, heater means for heating gases flowing through said by-pass passage to provide said isothermal expansion, sealed external counterflow passage means connected to said chamber for receiving gases from said chamber compressed by the action of said rotor and returning such gases to said chamber in the area of lower pressure gaseous condition C, and cooling means coupled to said external flow passage means for providing said isothermal compression, and variable throttle means for varying said A-isothermal expansion to vary the output of said engine, said variable throttle means including a plurality of inlet ports, and valve means for selectively communicating said inlet ports with said by-pass passage downstream of said heater means.

3. A heat engine according to claim 2 wherein said throttle valve is a rotary valve which admits gases into said inlet ports in sequence.

4. A heat engine of the type including a housing defining a generally cylindrical chamber, a rotor mounted within said chamber in eccentric relation, and vanes carried by said rotor in sliding sealing contact with said housing, said rotor being closest to said housing at one point in said chamber and most remote from said housing at a second point in said chamber, a working gas in said chamber, and in accordance with the Carnot cycle of operation said engine and said working gas having four gaseous conditions in sequence during rotation of said rotor as follows: A-isothermal expansion, B-reversible adiabatic expansion, C-isothermal compression and D-reversible adiabatic compression; the improvement residing in a by-pass passage coupled to said chamber on opposite sides of said one point and in the areas of gaseous conditions D and A, respectively, heater means for heating gases flowing through said by-pass passage to provide said isothermal expansion, sealed external counterflow passage means connected to said chamber for receiving gases from said chamber compressed by the action of said rotor and returning such gases to said chamber in the area of lower pressure gaseous condition C, and cooling means coupled to said external flow passage means for providing said isothermal compression, and heat exchange means for receiving a controllable selected portion only of said compressed gases from said chamber in the area of gaseous condition D, said heat exchange means being externally of said chamber and of the type suitable for changing external fluid termperature, said heat exchange means having a return line coupled to said chamber in the area of gaseous condition C.

5. A heat engine according to claim 4 wherein said heat exchanger return line is coupled to said counterflow passage means.

6. A heat engine according to claim 4 wherein said heat exchange means includes a heat producing condenser.

7. A heat engine according to claim 4 wherein said heat exchange means includes a heat producing condenser operable to heat the interior of a motor vehicle of which said heat engine is a part.

8. A heat engine according to claim 4 wherein said heat exchange means includes a heat receiving evaporator.

9. A heat engine according to claim 4 wherein said heat exchange means includes a heat receiving evaporator operable to cool the interior of a motor vehicle of which said heat engine is a part.

10. A heat engine according to claim 4 wherein said heat exchange means includes a heat producing condenser and a heat receiving evaporator selectively operable to heat and cool the interior of a motor vehicle.

* * * * *